(12) United States Patent
Balin

(10) Patent No.: US 12,466,295 B2
(45) Date of Patent: Nov. 11, 2025

(54) VEHICLE SEAT HAVING TILT AND TUMBLE FUNCTIONS

(71) Applicant: GM GLOBAL TECHNOLOGY OPERATIONS LLC, Detroit, MI (US)

(72) Inventor: Alexander I. Balin, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 267 days.

(21) Appl. No.: 18/315,014

(22) Filed: May 10, 2023

(65) Prior Publication Data
US 2024/0375558 A1 Nov. 14, 2024

(51) Int. Cl.
*B60N 2/10* (2006.01)
*B60N 2/02* (2006.01)
*B60N 2/12* (2006.01)

(52) U.S. Cl.
CPC .......... *B60N 2/10* (2013.01); *B60N 2/02246* (2023.08); *B60N 2/02253* (2023.08)

(58) Field of Classification Search
CPC ......... B60N 2/10; B60N 2/12; B60N 2/02246
See application file for complete search history.

(56) References Cited

U.S. PATENT DOCUMENTS

| | | | |
|---|---|---|---|
| 8,029,062 B2 * | 10/2011 | Appelqvist | B60N 3/063 297/344.1 |
| 8,480,051 B2 | 7/2013 | Muehlberger et al. | |
| 11,332,044 B2 | 5/2022 | Runde | |
| 11,447,044 B1 * | 9/2022 | Boks | B60N 2/02246 |
| 2009/0152433 A1 * | 6/2009 | Choi | B60N 2/02246 248/421 |
| 2019/0152352 A1 * | 5/2019 | Handigol | B60N 2/12 |
| 2020/0189421 A1 * | 6/2020 | Madhu | B60N 2/0881 |
| 2022/0274510 A1 * | 9/2022 | Kim | B60N 2/1842 |

FOREIGN PATENT DOCUMENTS

| | | | | |
|---|---|---|---|---|
| EP | 0231698 A1 * | 8/1987 | | B60N 2/165 |
| FR | 2718398 A1 | 10/1995 | | |
| JP | 2001246967 A | 9/2001 | | |

OTHER PUBLICATIONS

German Office Action for German Application No. 102023127171.7; dated Dec. 19, 2024; 7 pages.

* cited by examiner

*Primary Examiner* — David E Martinez
(74) *Attorney, Agent, or Firm* — CANTOR COLBURN LLP

(57) ABSTRACT

A seat assembly for a vehicle includes a seat, and a rail assembly operably connected to the seat to guide a forward/aft adjustment of a position of the seat in a direction parallel to a direction of the rail assembly. The rail assembly includes a forward/aft adjustment zone and a tilt adjustment zone. A seat motor is operably connected to the seat. The seat motor is configured to drive the seat along the rail assembly. A tilt adjustment mechanism is configured such that when the seat enters the tilt adjustment zone the seat is urged forward in a tilting motion about a seat pivot relative to the rail assembly, via translation of linear motion of the seat along the rail assembly into rotation of the seat about the seat pivot. The seat motor is configured to drive both the forward/aft adjustment and the tilting motion of the seat.

11 Claims, 6 Drawing Sheets

VEHICLE SEAT HAVING TILT AND TUMBLE FUNCTIONS

INTRODUCTION

The subject disclosure relates to vehicle seat systems, and more particularly to position adjustment of vehicle seats.

In vehicles having multiple rows of seats, in order to provide ingress/egress for an occupant of, for example, a third row seat, the second row seats are typically moved to provide enough room for an occupant to enter or exit the third row seat. Seats providing such functions typically utilize manually-operated fore/aft adjustment mechanisms on the seats together with manual latches, both of which utilize the occupant as the source of energy to fulfill such easy entry functions.

SUMMARY

In one exemplary embodiment, a seat assembly for a vehicle includes a seat, and a rail assembly operably connected to the seat to guide a forward/aft adjustment of a position of the seat in a direction parallel to a direction of the rail assembly. The rail assembly includes a forward/aft adjustment zone and a tilt adjustment zone. A seat motor is operably connected to the seat. The seat motor is configured to drive the seat along the rail assembly. A tilt adjustment mechanism is configured such that when the seat enters the tilt adjustment zone the seat is urged forward in a tilting motion about a seat pivot relative to the rail assembly, via translation of linear motion of the seat along the rail assembly into rotation of the seat about the seat pivot. The seat motor is configured to drive both the forward/aft adjustment and the tilting motion of the seat.

In addition to one or more of the features described herein, the tilt adjustment mechanism includes a rack secured to a floor rail of the rail assembly and a pinion positioned at a seat rail of the rail assembly. Engagement of the pinion with the rack urges rotation of the seat about the seat pivot.

In addition to one or more of the features described herein, the pinion engages the rack only when the seat is moved into the tilt adjustment zone of the rail assembly.

In addition to one or more of the features described herein, the seat pivot is positioned at the seat rail, and a bracket extends from the seat pivot to the seat, the seat bracket rotated about the seat pivot to urge the tilting motion of the seat.

In addition to one or more of the features described herein, the pinion is coaxial with the seat pivot.

In addition to one or more of the features described herein, the rack is positioned in the tilt adjustment zone.

In addition to one or more of the features described herein, a clutch controls engagement of the tilt adjustment mechanism.

In another exemplary embodiment, a vehicle includes a vehicle body defining an occupant compartment, and a plurality of seat assemblies located in the occupant compartment. At least one seat assembly of the plurality of seat assemblies includes a seat, and a rail assembly operably connected to the seat and to the vehicle body to guide a forward/aft adjustment of a position of the seat in a direction parallel to a direction of the rail assembly. The rail assembly includes a forward/aft adjustment zone and a tilt adjustment zone. A seat motor is operably connected to the seat. The seat motor is configured to drive the seat along the rail assembly. A tilt adjustment mechanism is configured such that when the seat enters the tilt adjustment zone the seat is urged forward in a tilting motion about a seat pivot relative to the rail assembly, via translation of linear motion of the seat along the rail assembly into rotation of the seat about the seat pivot. The seat motor is configured to drive both the forward/aft adjustment and the tilting motion of the seat.

In addition to one or more of the features described herein, the tilt adjustment mechanism includes a rack secured to a floor rail of the rail assembly, the floor rail secured to the vehicle body, and a pinion located at a seat rail of the rail assembly. The seat rail is operably connected to the seat. Engagement of the pinion with the rack urges rotation of the seat about the seat pivot.

In addition to one or more of the features described herein, the pinion engages the rack only when the seat is moved into the tilt adjustment zone of the rail assembly.

In addition to one or more of the features described herein, the seat pivot is positioned at the seat rail, and a bracket extends from the seat pivot to the seat. The seat bracket is rotated about the seat pivot to urge the tilting motion of the seat.

In addition to one or more of the features described herein, the pinion is coaxial with the seat pivot.

In addition to one or more of the features described herein, the rack is positioned in the tilt adjustment zone.

In addition to one or more of the features described herein, a clutch controls engagement of the tilt adjustment mechanism.

In yet another exemplary embodiment, a method of adjusting a position of a seat of a vehicle includes driving a seat along a rail assembly in a forward/aft adjustment zone of the rail assembly via operation of a seat motor, driving the seat into a tilt adjustment zone of the rail assembly located forward of the forward/aft adjustment zone via operation of the seat motor, and operating a tilt adjustment mechanism operably connected to the seat and the rail assembly via operation of the seat motor, thereby urging the seat forward in a tilting motion about a seat pivot relative to the rail assembly, via translation of linear motion of the seat along the rail assembly into rotation of the seat about the seat pivot.

In addition to one or more of the features described herein, the method includes operating the tilt mechanism includes engaging a pinion operably connected to the seat with a rack disposed at the rail assembly.

In addition to one or more of the features described herein, the method includes rotating the seat about a seat pivot via engagement of the pinion with the rack.

In addition to one or more of the features described herein, the pinion is coaxial with the seat pivot.

In addition to one or more of the features described herein, the rack is positioned in the tilt adjustment zone.

In addition to one or more of the features described herein, the tilt adjustment mechanism is operated via selective engagement of a clutch mechanism operably connected to the tilt adjustment mechanism.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
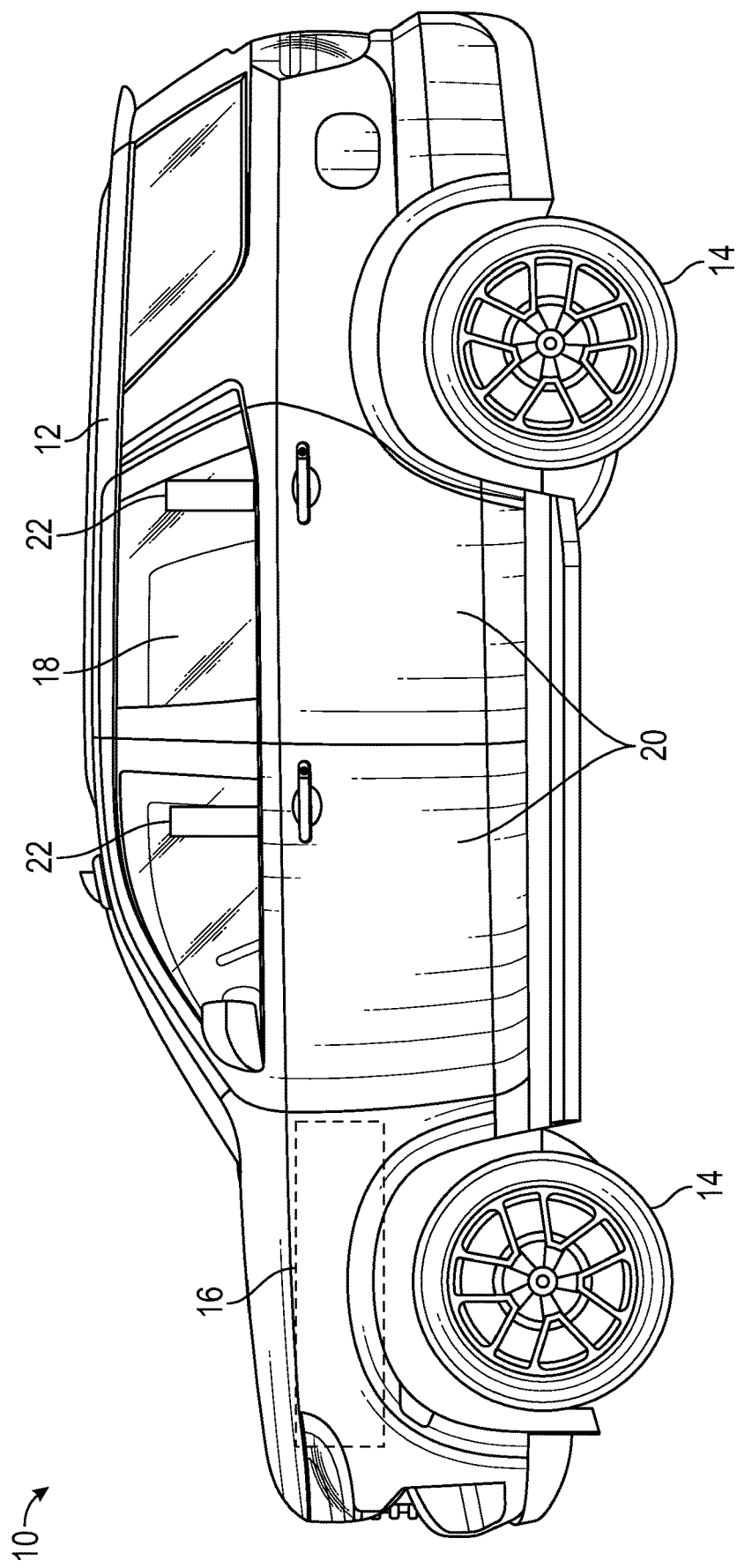
FIG. 1 is a schematic illustration of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a vehicle 10 is illustrated in FIG. 1. The vehicle 10 includes a vehicle body 12 supported by a plurality of wheels 14. A power system 16, such as an internal combustion engine, an electric motor, or a hybrid system is operably connected to the plurality of wheels 14 to drive the plurality of wheels 14. The body 12 defines an occupant compartment 18 inside of the body 12, and one or more doors 20 are provided for occupant entry and exit of the occupant compartment 18 by the occupant. A plurality of rows of seat assemblies 22 are positioned in the occupant compartment 18.

Figure 2:
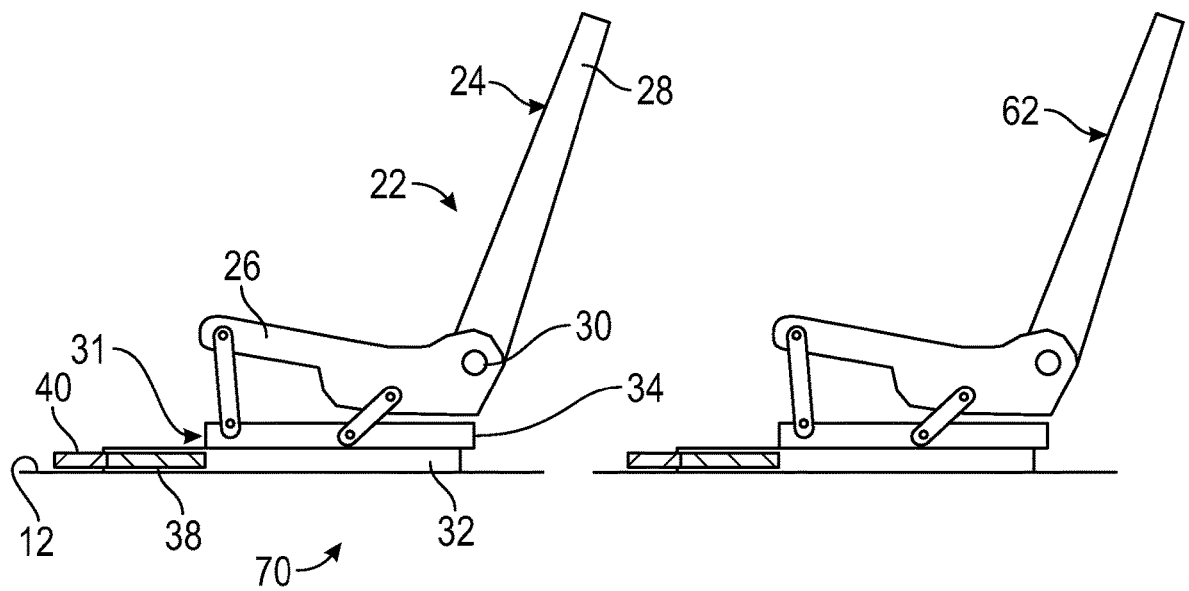
FIG. 2 is a side view of an embodiment of a vehicle seat.
Figure 3:
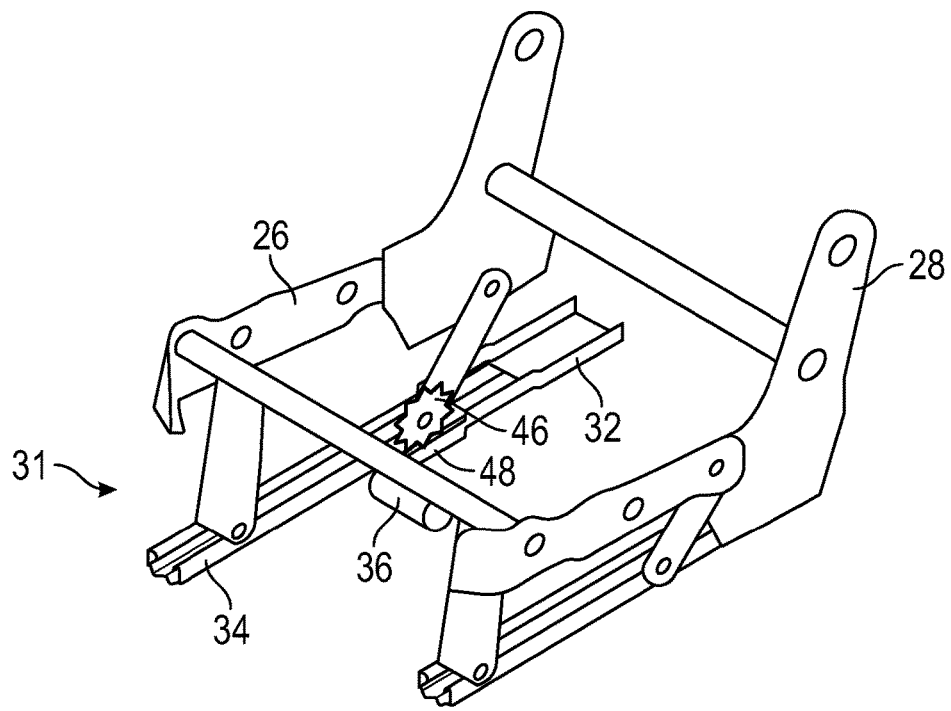
FIG. 3 is a partial perspective view of an embodiment of a vehicle seat.

Referring now to FIG. 2, the seat assembly 22 includes a seat 24 including a seat base 26 and a seat back 28. In some embodiments, a seat back hinge 30 connects the seat back 28 to the seat base 26 allowing for adjustment of a position of the seat back 28 relative to the seat base 26. The seat 24 is connected to a seat adjuster 31 that allows for forward and aft adjustment of a seat position relative to the body 12. The seat adjuster 30 includes a floor rail 32 fixed to the body 12 and a seat rail 34 operably connected to the seat 24 and slidably installed to the floor rail 32. As illustrated in FIG. 3, the seat adjuster 31 includes a seat motor 36 that urges the seat 24 forward and aft with the seat rail 34 and the floor rail 32 guiding the forward and aft movement.

Figure 4:
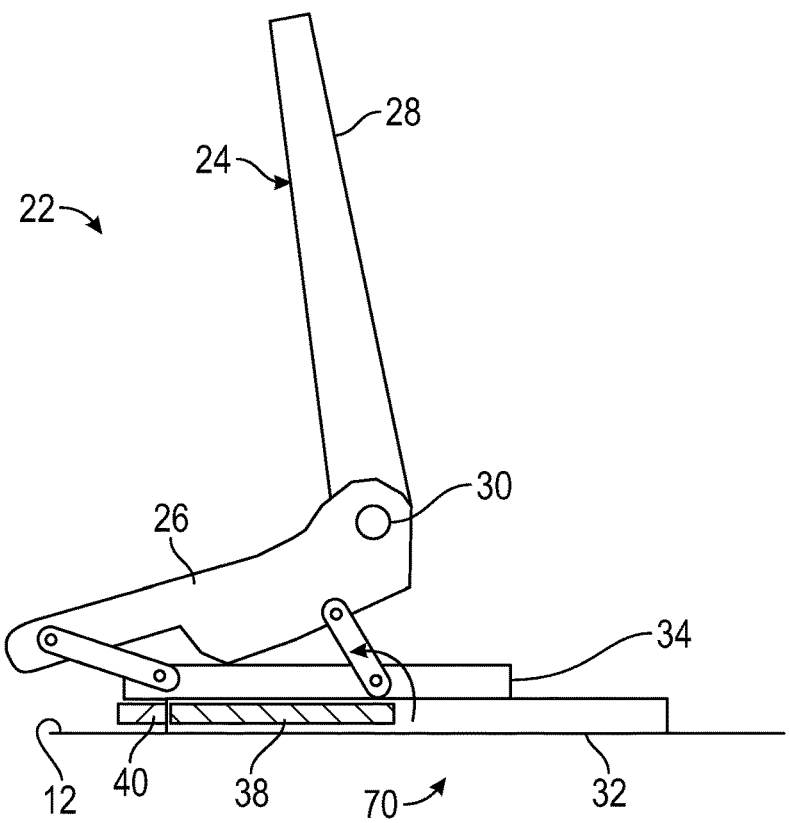
FIG. 4. is another side view of an embodiment of a vehicle seat.

Referring again to FIG. 2, the seat assembly 22 has two adjustment modes. The first mode is comfort adjustment mode, where the seat 24 is moved merely forward and aft along the floor rail 32 via operation of the seat motor 36. This first mode is enabled along a comfort adjustment zone 38 of the floor rail 32. When the seat 24 is moved sufficiently forward, the seat 24 enters an easy entry or tilt adjustment zone 40 of the floor rail 32, as illustrated in FIG. 4. In the tilt adjustment zone 40, the seat 24 is driven by the seat motor 36 to move in a tilt mode, in which the seat 24 tilts, rotates or tumbles forward relative to the seat rail 34. In the tilt adjustment zone 40, linear motion of the seat along the floor rail 32 is transferred into rotary motion of the seat to perform the tilting or tumbling motion. Moving the seat 24 via the tilt mode allows for easier entry and egress of an occupant of a more rearward seat 62 by increasing the space between the seat 24 and the more rearward seat 62. In some embodiments, the more rearward seat 62 is a third row or second row seat.

Figure 5A:
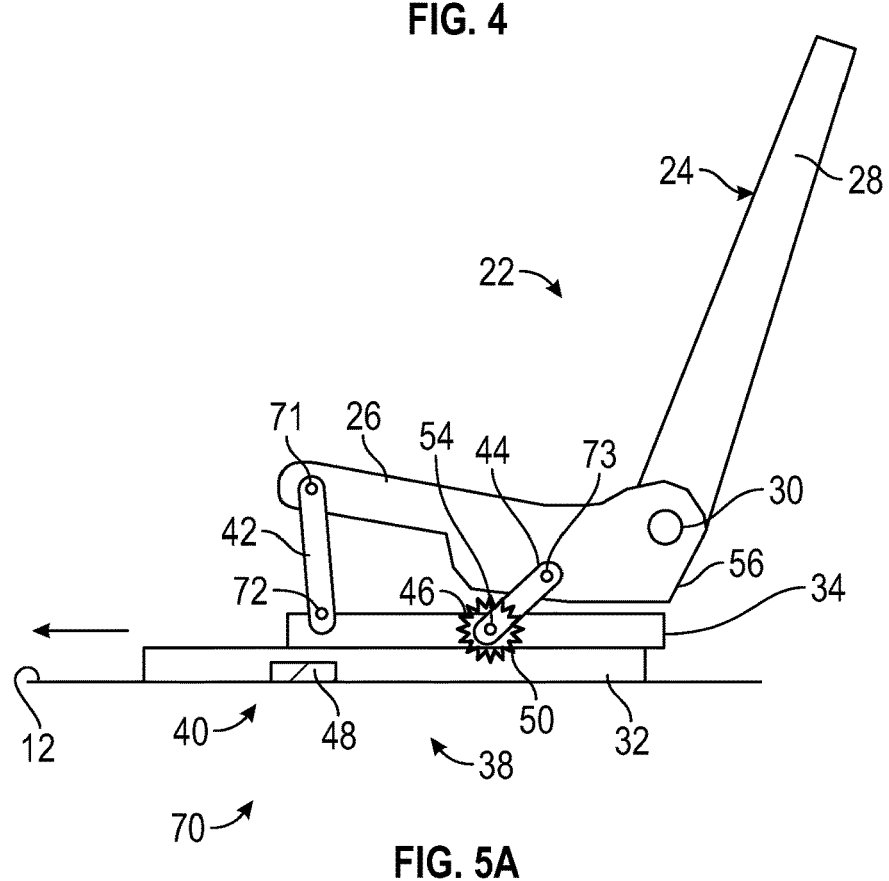
FIGS. 5(A)-5(C) illustrate motion of an embodiment of a vehicle seat utilizing a rack and pinion arrangement.
Figure 5B:
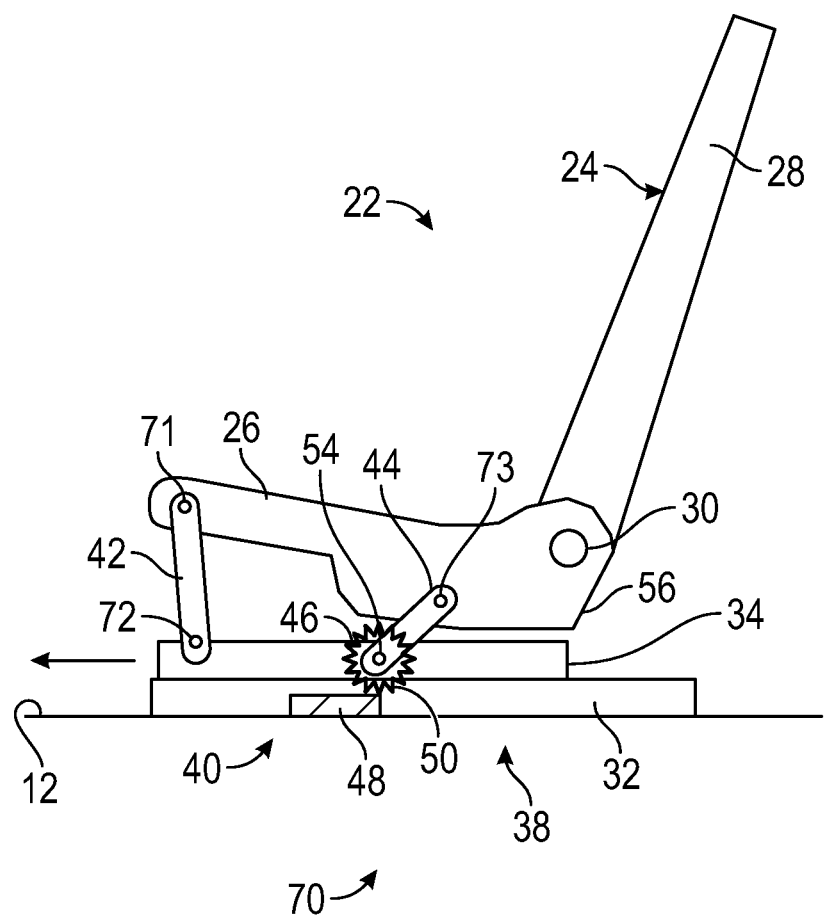
Figure 5C:
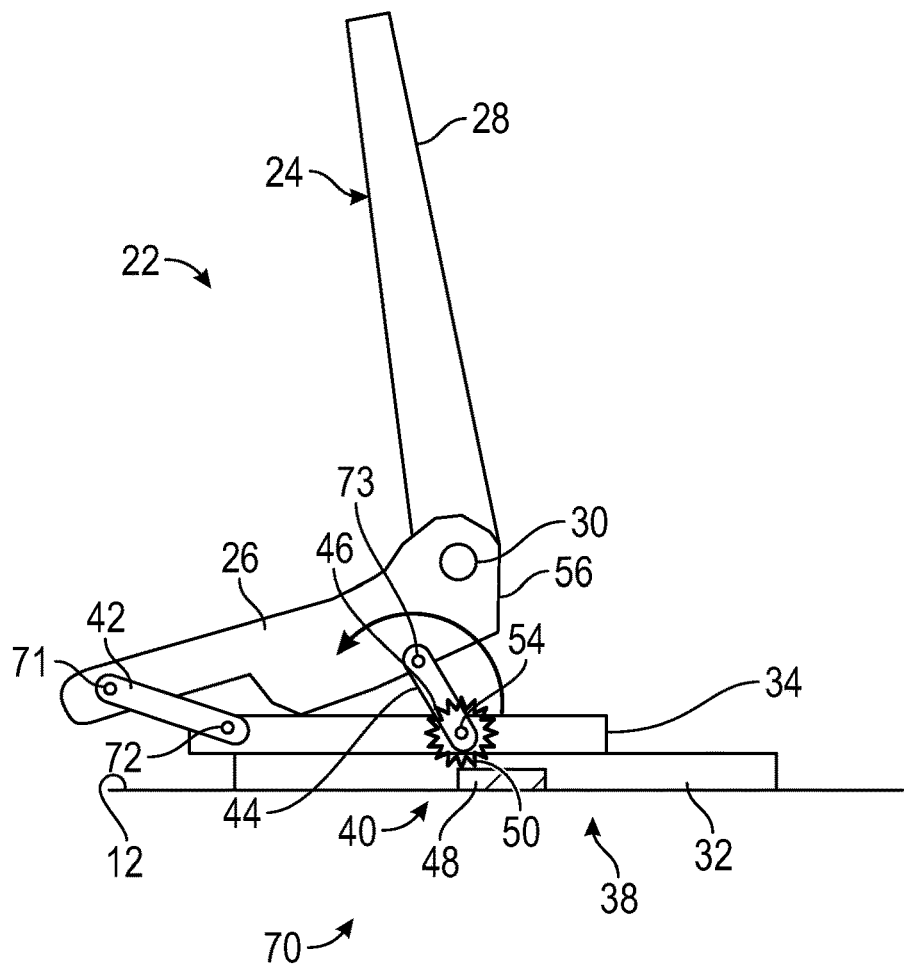

Referring now to FIG. 5(A)-5(C), the motion of the seat 24 in each of the two modes will be described in more detail. The seat 24 is operably connected to the seat rail 34 via a forward bracket 42 and a rearward bracket 44. The forward bracket 42 is connected to the seat 24 via a forward seat pivot 71 and is connected to the seat rail 34 via a forward rail pivot 72. Similarly, the rearward bracket 44 is connected to the seat 24 via a rearward seat pivot 73 and is connected to the seat rail 34 via a rearward rail pivot 54. In one embodiment, the rearward bracket 44 is connected to a pinion 46 coaxially with the rearward rail pivot 54. The pinion 46 is engageable with a rack 48 located along the floor rail 32 in the tilt adjustment zone 40 such that the pinion 46 engages with the rack 48 when the pinion 46 enters the tilt adjustment zone 40. In FIG. 5(A), the seat 24 is in the comfort adjustment zone 38 and the pinion 46 does not engage the rack 48. As a result, the seat 24 moves linearly along the floor rail 32 to adjust the fore/aft position of the seat 24. Referring to FIG. 5(B), as the seat 24 is moved further forward by operation of the seat motor 36 and enters the tilt adjustment zone 40, pinion teeth 50 of the pinion 46 engage with complementary rack teeth 52, shown best in FIG. 6, of the rack 48. Referring now to FIG. 5(C), as the seat 24 travels in the tilt adjustment zone 40, the engagement of the pinion 46 with the rack 48 urges rotation of the rearward bracket 44 about the rearward rail pivot 54 at the seat 24. This transfers linear motion of the seat 24 along the floor rail 32 into rotary motion of the rearward bracket 44 about the rearward rail pivot 54, via the rack 48 and pinion 46 arrangement. This rotation lifts a rear side 56 of the seat 24 and tilts or tumbles the seat 24 in a generally forward direction. While the tilt or tumbling of the seat 24 is accomplished via the rack 48 and pinion 46 arrangement in the illustrated embodiments, one skilled in the art will readily appreciate that the motion may be accomplished with, for example, a friction roller and plate, a cam and lever arrangement, a cable and pulley apparatus, or the like.

Figure 6:
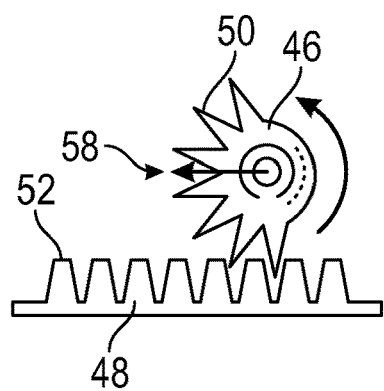
FIG. 6 illustrates another embodiment of a rack and pinion arrangement.

As illustrated in FIG. 5(A)-5(C), in some embodiments the pinion teeth 50 are arrayed around an entire circumference of the pinion 46. In other embodiments, the pinion 46 may include pinion teeth 50 in only one circumferential pinion sector 58, as illustrated in FIG. 6. In the illustrated embodiment, the pinion sector 58 is 180 circumferential degrees, but one skilled in the art will readily appreciate that this is merely exemplary and that the pinion sector 58 may be, for example, 90 circumferential degrees, 120 circumferential degrees, 240 circumferential degrees or 270 circumferential degrees, depending on the length of the tilt adjustment zone 40 and the desired degree of tilt or rotation of the seat 24.

Figure 7A:
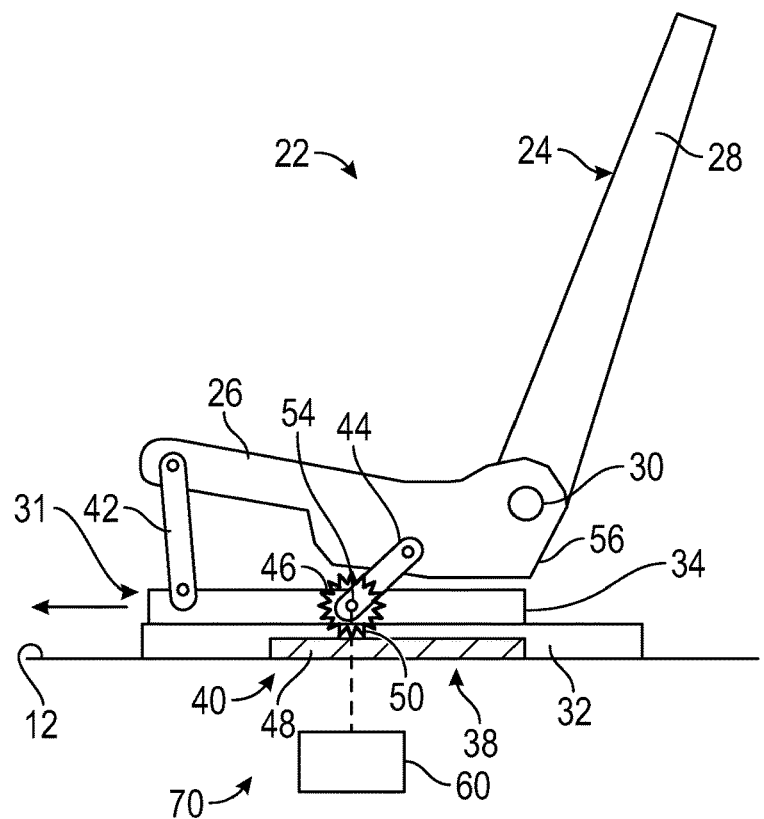
FIGS. 7(A) and 7(B) illustrate motion of an embodiment of a vehicle seat utilizing a rack and pinion with a clutch.
Figure 7B:
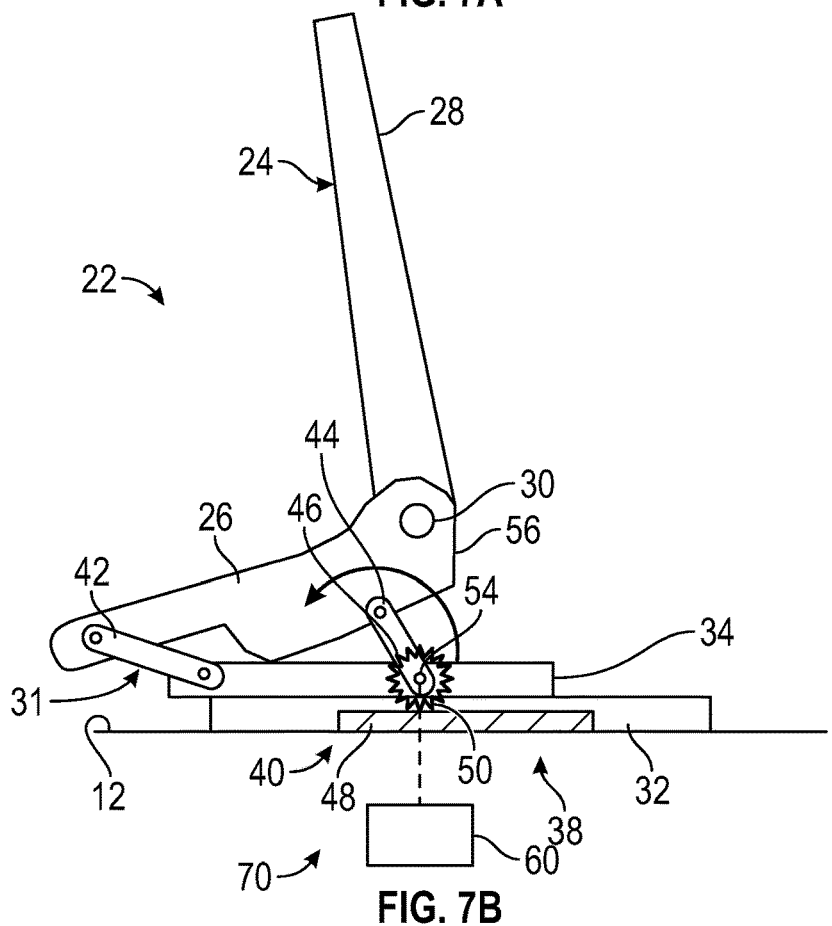

Another embodiment is illustrated in FIGS. 7(A) and 7(B). In this embodiment, the rack 48 extends throughout both the comfort adjustment zone 38 and the tilt adjustment zone 40, with the pinion 46 engaged to the rack 48. The seat adjuster 31 includes a clutch 60 controlling transfer of energy between the pinion 46 and the rearward bracket 44. When the seat 24 is in the comfort adjustment zone 38, the clutch 60 is not engaged, so no torque is transferred between the pinion 46 and the rearward bracket 44. As a result, the seat 24 merely slides forward or aft for comfort adjustment of the seat 24 position. When the seat 24 is moved into the tilt adjustment zone 40, as shown in FIG. 7(B), the clutch 60 is engaged. With the clutch 60 engaged, torque is transferred from the pinion 46 to the rearward bracket 44, urging rotation of the rearward bracket 44 about the rearward rail pivot 54 at the seat 24. This rotation lifts the rear side 56 of the seat 24 and tilts or tumbles the seat 24 in a generally forward direction.

The apparatus disclosed herein couples the fore/aft adjustment and the tilt adjustment of the seat 24 by transferring linear motion of the seat 24 along the floor rail 32 into rotational motion of the seat 24 resulting in a tilt or tumbling motion of the seat 24 in the tilt adjustment zone 40. It further allows for utilization of a common seat motor 36 for the comfort adjustment and the tilt adjustment, thus saving packaging volume and weight.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A seat assembly for a vehicle, comprising:
   a seat;
   a rail assembly operably connected to the seat to guide a forward/aft adjustment of a position of the seat in a direction parallel to a direction of the rail assembly, the rail assembly including a forward/aft adjustment zone and a tilt adjustment zone;
   a seat motor operably connected to the seat, the seat motor configured to drive the seat along the rail assembly; and
   a tilt adjustment mechanism configured such that when the seat enters the tilt adjustment zone the seat is urged forward in a tilting motion about a seat pivot relative to the rail assembly, via translation of linear motion of the seat along the rail assembly into rotation of the seat about the seat pivot;
   wherein the seat motor is configured to drive both the forward/aft adjustment and the tilting motion of the seat;
   wherein the tilt adjustment mechanism includes:
      a rack secured to a floor rail of the rail assembly; and
      a pinion disposed at a seat rail of the rail assembly;
      wherein engagement of the pinion with the rack urges rotation of the seat about the seat pivot;
   wherein one of:
      the pinion engages the rack only when the seat is moved into the tilt adjustment zone of the rail assembly; or
      the pinion is coaxial with the seat pivot.

2. The seat assembly of claim 1, wherein the seat pivot is disposed at the seat rail, and a seat bracket extends from the seat pivot to the seat, the seat bracket rotated about the seat pivot to urge the tilting motion of the seat.

3. The seat assembly of claim 1, wherein the rack is disposed in the tilt adjustment zone.

4. The seat assembly of claim 1, further comprising a clutch to control engagement of the tilt adjustment mechanism.

5. A vehicle, comprising:
   a vehicle body defining an occupant compartment;
   a plurality of seat assemblies disposed in the occupant compartment, at least one seat assembly of the plurality of seat assemblies including:
      a seat;
      a rail assembly operably connected to the seat and to the vehicle body to guide a forward/aft adjustment of a position of the seat in a direction parallel to a direction of the rail assembly, the rail assembly including a forward/aft adjustment zone and a tilt adjustment zone;
      a seat motor operably connected to the seat, the seat motor configured to drive the seat along the rail assembly; and
      a tilt adjustment mechanism configured such that when the seat enters the tilt adjustment zone the seat is urged forward in a tilting motion about a seat pivot relative to the rail assembly, via translation of linear motion of the seat along the rail assembly into rotation of the seat about the seat pivot;
   wherein the seat motor is configured to drive both the forward/aft adjustment and the tilting motion of the seat;
   wherein the tilt adjustment mechanism includes:
      a rack secured to a floor rail of the rail assembly, the floor rail secured to the vehicle body; and
      a pinion disposed at a seat rail of the rail assembly, the seat rail operably connected to the seat;
      wherein engagement of the pinion with the rack urges rotation of the seat about the seat pivot;
   wherein one of:
      wherein the pinion engages the rack only when the seat is moved into the tilt adjustment zone of the rail assembly; or
      wherein the pinion is coaxial with the seat pivot.

6. The vehicle of claim 5, wherein the seat pivot is disposed at the seat rail, and a seat bracket extends from the seat pivot to the seat, the seat bracket rotated about the seat pivot to urge the tilting motion of the seat.

7. The vehicle of claim 5, wherein the rack is disposed in the tilt adjustment zone.

8. The vehicle of claim 5, further comprising a clutch to control engagement of the tilt adjustment mechanism.

9. A method of adjusting a position of a seat of a vehicle, comprising:
   driving a seat along a rail assembly in a forward/aft adjustment zone of the rail assembly via operation of a seat motor;
   driving the seat into a tilt adjustment zone of the rail assembly located forward of the forward/aft adjustment zone via operation of the seat motor; and operating a tilt adjustment mechanism operably connected to the seat and the rail assembly via operation of the seat motor, thereby urging the seat forward in a tilting motion about a seat pivot relative to the rail assembly, via translation of linear motion of the seat along the rail assembly into rotation of the seat about the seat pivot wherein operating the tilt mechanism comprises engaging a pinion operably connected to the seat with a rack disposed at the rail assembly;

further comprising rotating the seat about a seat pivot via engagement of the pinion with the rack; and wherein the pinion is coaxial with the seat pivot.

10. The method of claim 9, wherein the rack is disposed in the tilt adjustment zone.

11. The method of claim 9, further comprising operating the tilt adjustment mechanism via selective engagement of a clutch mechanism operably connected to the tilt adjustment mechanism.

\* \* \* \* \*